(12) United States Patent
Chang et al.

(10) Patent No.: US 6,805,040 B1
(45) Date of Patent: Oct. 19, 2004

(54) TEA MAKER

(76) Inventors: Richard Chang, 4th Fl., No. 276, Sec. 1, Ta Tung Rd., Hsi Chih Town, Taipei Hsien (TW); Mario Bernardo Accumanno, 44 Cutter Dr., East Hanover, NJ (US) 07936; Michael William Crowley, 4 Meadowbrook Rd., Randolph, NJ (US) 07869

( * ) Notice: Subject to any disclaimer, the term of this patent is extended or adjusted under 35 U.S.C. 154(b) by 0 days.

(21) Appl. No.: 10/832,394

(22) Filed: Apr. 27, 2004

(30) Foreign Application Priority Data

Jun. 26, 2003 (CH) .......................................... 03149323 A

(51) Int. Cl.[7] .......................... A47J 31/02; A47J 31/10; A47J 31/14; A47J 31/24; A23L 1/00
(52) U.S. Cl. .......................... 99/285; 99/299; 99/306; 99/323
(58) Field of Search .......................... 99/495, 516, 536, 99/452–455, 275, 279, 285, 295–299, 304–306, 323, 323.1, 323.3, 316, 317; 210/474–479, 181; 426/432, 433, 439

(56) References Cited

U.S. PATENT DOCUMENTS

| | | | | |
|---|---|---|---|---|
| 2,021,293 A | * | 11/1935 | De Silva ..................... | 99/299 |
| 4,785,723 A | * | 11/1988 | Sheen ......................... | 99/279 |
| 5,632,193 A | * | 5/1997 | Shen ........................... | 99/285 |
| 5,725,765 A | * | 3/1998 | Shen ........................... | 210/238 |
| 5,826,493 A | * | 10/1998 | Tien Lin ..................... | 99/306 |
| 5,855,160 A | * | 1/1999 | Shen ........................... | 99/279 |
| 5,862,739 A | * | 1/1999 | Lin ............................. | 99/285 |
| 5,943,946 A | * | 8/1999 | Chen .......................... | 99/297 |
| 6,058,827 A | * | 5/2000 | Lin Tien ..................... | 99/299 |
| 6,164,190 A | * | 12/2000 | Tien Lin ..................... | 99/299 |
| 6,327,965 B1 | * | 12/2001 | Lin Tien ..................... | 99/299 |
| 6,343,542 B1 | * | 2/2002 | Shen ........................... | 99/299 |
| 6,742,442 B1 | * | 6/2004 | Su ............................... | 99/281 |

* cited by examiner

Primary Examiner—Timothy F. Simone
(74) Attorney, Agent, or Firm—Bacon & Thomas PLLC

(57) ABSTRACT

An tea maker is constructed to include an infusion cup, the infusion cup having a skirt for supporting on any of a variety of cups, a stopper mounted in the bottom through hole of the infusion cup, a resilient member secured between a base of the stopper and the bottom wall of the infusion cup to hold the stopper in the closed position to seal the bottom through hole of the infusion cup against leakage, a link, and a rocker arm fastened pivotally with the infusion cup and coupled between the stopper and the link and adapted to lift the stopper from the bottom through hole upon downward movement of the link by the user.

11 Claims, 4 Drawing Sheets

TEA MAKER

BACKGROUND OF THE INVENTION

1. Field of the Invention

The present invention relates to a tea maker and, more particularly, to an improved structure of tea maker, which enhances a sealing effect of a stopper, thereby preventing a leakage.

2. Description of Related Art

A variety of tea makers are commercially available and popularly used by consumers due to the advantage of being able to continue working while the tea is being prepared. Ease of use is an important factor to consumers when choosing a tea maker.

A conventional tea maker comprises an infusion cup having a bottom through hole, and a stopper movably mounted in the bottom through hole of the infusion cup and controlled to close/open the bottom through hole. The stopper may be variously embodied. For example, the stopper can be a steel ball, plate member, or conical member. The tea maker further comprises a link mechanism provided at one side of the infusion cup for operation by the user to move the stopper in the bottom through hole of the infusion cup, i.e., to move the stopper between the closed position where the bottom through hole is closed, and the open position where the bottom through hole is opened for enabling prepared tea to flow out of the infusion cup.

However, the stopper of the aforesaid tea maker uses its gravity weight to seal the bottom through hole of the infusion cup. U.S. Pat. No. 5,855,160 discloses a tea maker in which a ball is mounted in the bottom center hole of the cup to control passage of the infused beverage. When infusing tea-leaves in boiling water in the infusion cup, the ball may lift slightly away from the bottom center hole of the infusion cup, thereby causing a leakage whereby an inappropriate amount of water may be in the tea maker.

SUMMARY OF THE INVENTION

The present invention has been accomplished under the circumstances in view. It is therefore the main object of the present invention to provide a tea maker, which enhances the sealing effect of the stopper, thereby preventing a leakage.

To achieve this and other objects of the present invention, the tea maker is comprised of an infusion cup, a stopper, resilient means, a link, and a rocker arm. The infusion cup comprises a bottom wall, a through hole defined in the bottom wall, a sliding groove defined in one side face thereof, and at least one foot member formed on the bottom wall and having coupling means. The stopper is movably mounted in the through hole of the infusion cup, and comprises a parachute-like head, and a base. The parachute-like head is suspended inside the infusion cup and adapted to close the through hole of the infusion cup. The base is suspended outside the infusion cup, and the coupling means is located on the base. The resilient means is mounted on the stopper and secured between the base of the stopper and the bottom wall of the infusion cup. The link is movably received in the sliding groove of the infusion cup, having the coupling means mounted in a bottom end thereof. The rocker arm is fastened pivotally with the infusion cup and coupled between the link and the stopper, having first coupling means disposed on the middle thereof and pivotally coupled to the coupling means of the at least one foot member of the infusion cup, a second coupling means disposed at a first end thereof and pivotally coupled to the coupling means of the stopper, and third coupling means disposed at a second end thereof and pivotally coupled to the coupling means of the link.

When infusing tea, the stored tension of the resilient means forces the stopper downwards, keeping the parachute-like head of the stopper firmly pressed on the inner surface of the bottom wall of the infusion cup to close the through hole, preventing otherwise lifting of the stopper by buoyant forces.

Further, the infusion cup can be made having a skirt mounted around the bottom wall for supporting the infusion cup on any of a variety of cups. A handle may be formed integral with the outside wall of the infusion cup so that the user can hold the infusion cup conveniently. A filter may be mounted in the infusion cup to remove solid matters from prepared tea. When a different type of filter is installed in the infusion cup, the tea maker can alternatively serve as a coffee maker. The infusion cup can be transparent, and has a measurement scale on an outside wall thereof.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
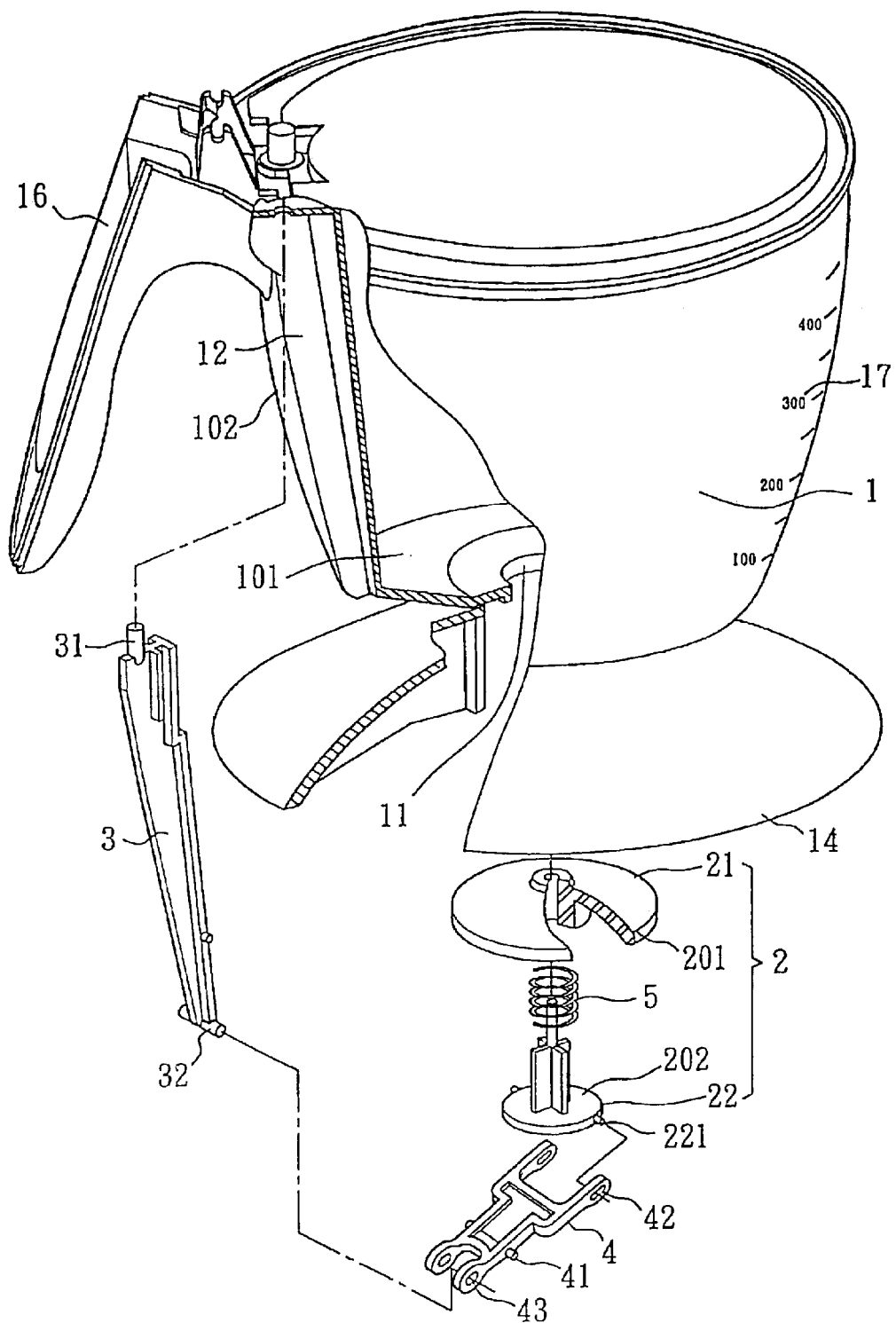
FIG. 1 is an exploded, cutaway view of a tea maker according to the present invention.
Figure 2:
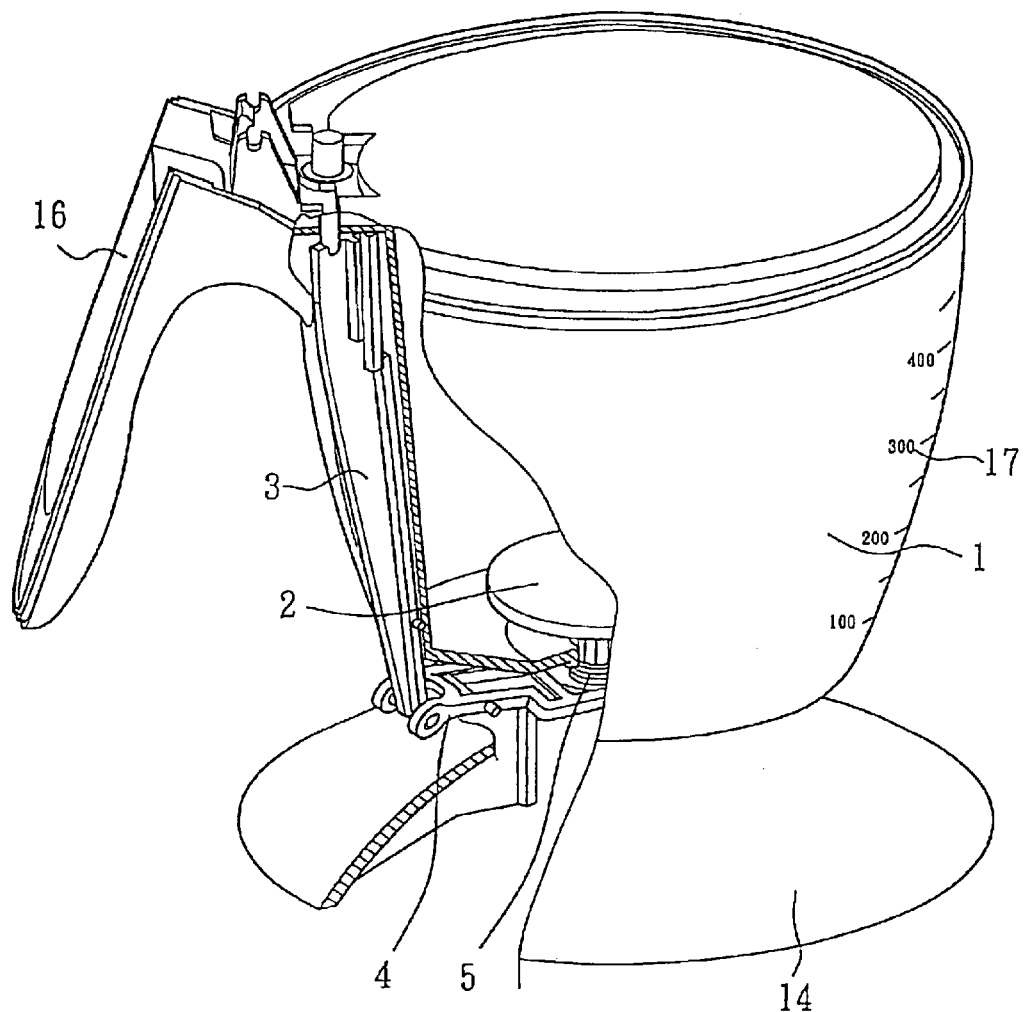
FIG. 2 is a cutaway view of the tea maker according to the present invention.
Figure 3:
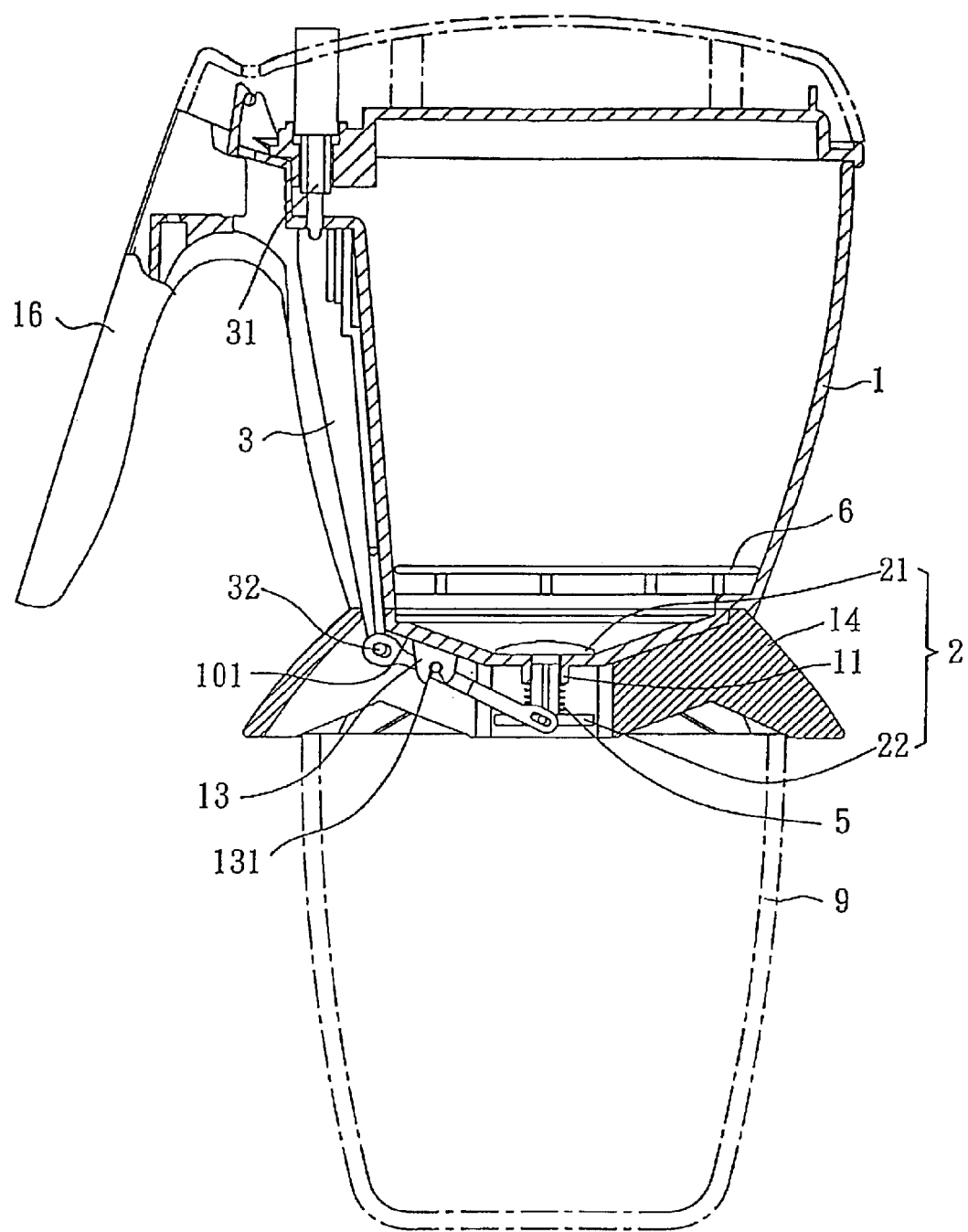
FIG. 3 is a side view in section of the tea maker according to the present invention, showing the through hole of the infusion cup closed.

Referring to FIGS. 1~3, a tea maker in accordance with the present invention is shown and comprised of an infusion cup 1, a stopper 2, a resilient member 5, a link 3, and a rocker arm 4. The infusion cup 1 has a through hole 11, a sliding groove 12, and a foot member 13. The through hole 11 extends through the bottom wall 101 of the infusion cup 1. The sliding groove 12 is formed in one side face 102 of the infusion cup 1. The foot member 13 extends outwards from the bottom wall 101 of the infusion cup 1 to a certain distance, and has a coupling portion, for example, a pivot hole 131. According to the present preferred embodiment, the infusion cup 1 is a transparent cup having a measurement scale 17 on the outer surface. A wire gauze filter 6 is mounted inside the infusion cup 1, and adapted to stop solid matter from passing through the through hole 11. Further, a handle 16 is located on the side face 102 of the infusion cup 1. Through the handle 16, the user can hold the infusion cup 1 conveniently.

The stopper 2 is axially movably mounted in the through hole 11 in the bottom wall 101 of the infusion cup 1 and adapted to close the through hole 11. The stopper 2 is comprised of an upper stopper element 201 and a lower stopper element 202. The upper stopper element 201 has a parachute-like head 21 suspended inside the infusion cup 1 and adapted to close the through hole 11 of the infusion cup 1. The lower stopper element 202 is fastened to the upper stopper element 201, and has a base 22 suspended outside the infusion cup 1 and a coupling device, for example, a pivot pin 221 at the base 22.

The resilient member 5 is mounted on the base 22 and supported between the base 22 of the stopper 2 and the bottom wall 101 of the infusion cup 1, holding the stopper 2 in the closed position where the parachute-like head 21 seals the through hole 11 of the infusion cup 1.

Further, the link 3 is slidably mounted in the sliding groove 12 in the side face 102 of the infusion cup 1, and has a bottom end terminating in a coupling device, for example, a transverse pivot 32, and a top end terminating in a finger rod 31.

The rocker arm 4 has first coupling means, for example, a pivot pin 41 transversely disposed on the middle, second coupling means, for example, two pivot holes 42 aligned at one end of the rocker arm, and a third coupling means, for example, two pivot holes 43 aligned at the other end of the rocker arm. The pivot pin 41 is pivotally coupled to the pivot hole 131 of the foot member 13 of the infusion cup 1. The pivot holes 42 are coupled to the two ends of the pivot pin 221 of the stopper 2. The pivot holes 43 are coupled to the two ends of the transverse pivot 32 of the link 3. When installed, the rocker arm 4 can be turned about the axis passing through the pivot hole131 of the foot member 13 of the infusion cup 1 to lift or lower the stopper 2.

The infusion cup 1 further comprises a skirt 14 extended around the bottom wall 101. When making tea, the user can hold the handle 16 of the infusion cup 1 and put the infusion cup 1 on a cup 9, keeping the skirt 14 supported on the rim of the cup 9. By means of the skirt 14, the infusion cup 1 can be supported on any of a variety of cups. Further, when infusing tea (tea-leaves), the stored tension of the resilient member 5 forces the stopper 2 downwards, keeping the parachute-like head 21 firmly pressed on the inner surface of the bottom wall 101 of the infusion cup 1 to close the through hole 11, preventing lifting of the stopper 2 by buoyant force.

Figure 4:
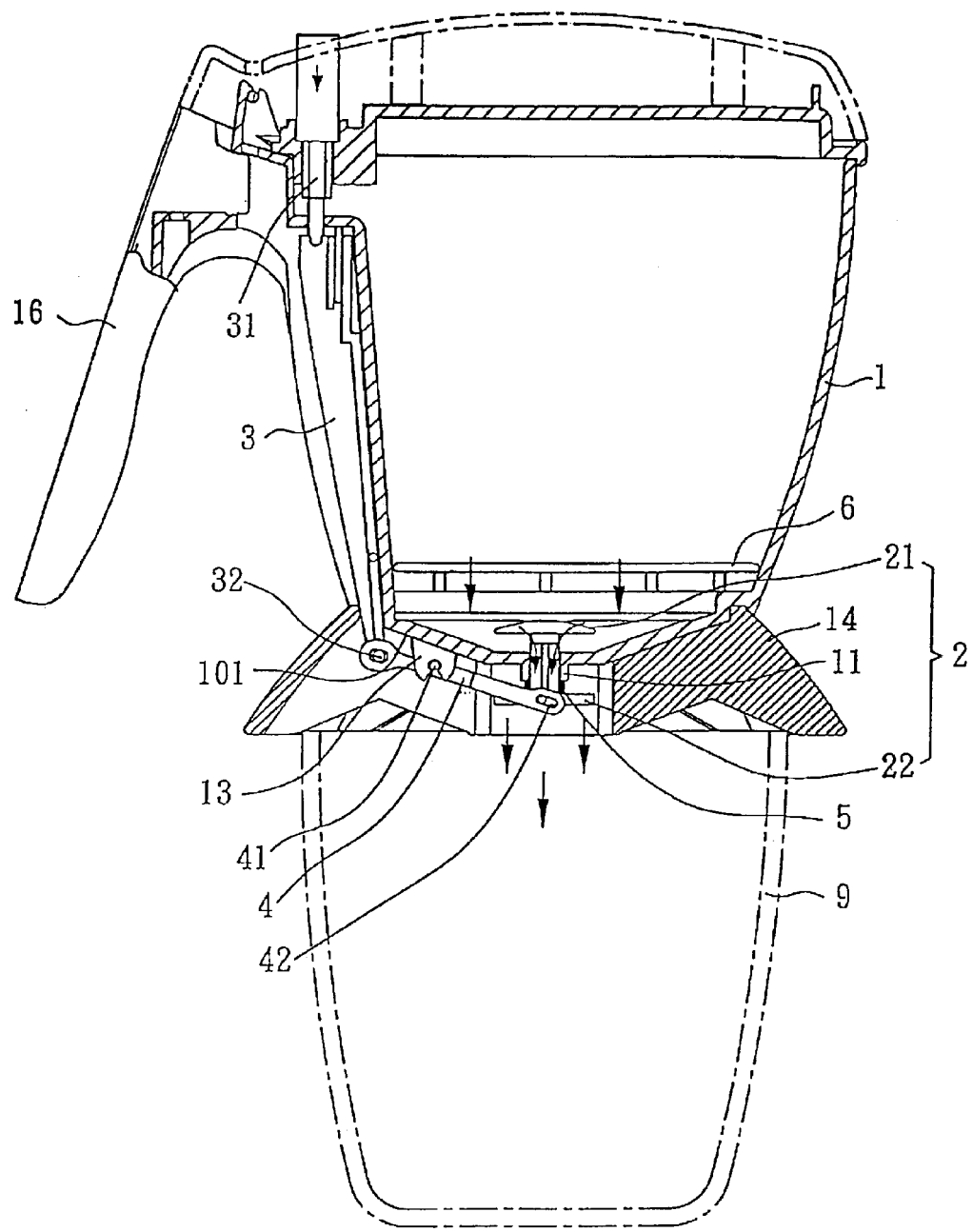
FIG. 4 is similar to FIG. 3 but showing the stopper lifted, whereby the through hole opened.

Referring to FIG. 4, after tea-leaves have been well infused in boiling water, the user can directly press the finger rod 31 of the link 3 to lower the link 3 along the sliding groove 12, thereby causing the rocker arm 4 to be turned about the axis passing through the pivot hole 131 of the foot member 13 of the infusion cup 1 to lift the stopper 2, for enabling prepared tea to flow out of the infusion cup 1 through the through hole 11 to the cup Further, the invention is not limited to the purpose of infusion tea. By means of using a different type of filter paper to substitute for the aforesaid wire gauze filter 6, the invention can also be used to make coffee. Through the measurement scale 17 on the outside wall of the infusion cup 1, the user can visually measure the amount of water put in the infusion cup 1 subject to the amount of tea-leaves (or coffee) to be applied.

A prototype of tea maker has been constructed with the features of FIGS. 1~4. The tea maker functions smoothly to provide all of the features discussed earlier.

Although a particular embodiment of the present invention has been described in detail for purposes of illustration, various modifications and enhancements may be made without departing from the scope of the invention. Accordingly, the invention is not to be limited except as by the appended claims.

What is claimed is:

1. A tea maker comprising:

an infusion cup, said infusion cup comprising a bottom wall, a through hole in said bottom wall, a sliding groove in one side face thereof, and at least one foot member formed on said bottom wall, said at least one foot member having coupling means;

a stopper movably mounted in the through hole of said infusion cup, said stopper comprising a parachute-like head, and a base, wherein said parachute-like head is suspended inside said infusion cup and adapted to close the through hole of said infusion cup, said base suspended outside said infusion cup, and coupling means located on said base;

resilient means mounted on said stopper and secured at one end of the resilient means to said base of said stopper and secured at another end of the resilient means to the bottom wall of said infusion cup;

a link movably received in the sliding groove of said infusion cup, said link having coupling means in a bottom end thereof; and a rocker arm fastened pivotally with said infusion cup and coupled between said link and said stopper, said rocker arm having first coupling means disposed on the middle thereof and pivotally coupled to the coupling means of said at least one foot member of said infusion cup, a second coupling means disposed at a first end thereof and pivotally coupled to the coupling means of said stopper, and third coupling means disposed at a second end thereof and pivotally coupled to the coupling means of said link.

2. The tea maker as claimed in claim 1, wherein said stopper comprises an upper stopper element, and a lower stopper element, wherein said upper stopper element having a part suspended inside said infusion cup and forming said parachute-like head, said lower stopper element connected to said upper stopper element, said lower stopper having a part extended out of said infusion cup and forming said base.

3. The tea maker as claimed in claim 1, wherein the coupling means of said at least one foot member of said infusion cup is comprised of a pivot hole, and the first coupling means of said rocker arm is a pivot pin coupled to the pivot hole of the coupling means of said at least one foot member of said infusion cup.

4. The tea maker as claimed in claim 1, wherein the coupling means of said stopper is a pivot pin, and the second coupling means of said rocker arm is comprised of a pivot hole coupled to the pivot pin of the coupling means of said stopper.

5. The tea maker as claimed in claim 1, wherein the coupling means of said link is a pivot pin, and the third coupling means of said rocker arm is comprised of a pivot hole coupled to the pivot pin of the coupling means of said link.

6. The tea maker as claimed in claim 1, wherein said infusion cup has a skirt extended around said bottom wall.

7. The tea maker as claimed in claim 6, wherein said skirt of said infusion cup is supportable on a cup.

8. The tea maker as claimed in claim 1, wherein said infusion cup has a handle located on said side face.

9. The tea maker as claimed in claim 1, further comprising a filter mounted in said infusion cup.

10. The tea maker as claimed in claim 1, wherein said infusion cup is transparent.

11. The tea maker as claimed in claim 10, wherein said infusion cup has a measurement scale formed on an outside wall thereof.

* * * * *